United States Patent
Monden (10) Patent No.: US 7,769,206 B2
(45) Date of Patent: Aug. 3, 2010

(54) FINGER/PALM PRINT IMAGE PROCESSING SYSTEM AND FINGER/PALM PRINT IMAGE PROCESSING METHOD

(75) Inventor: Akira Monden, Tokyo (JP)

(73) Assignee: NEC Corporation (JP)

(*) Notice: Subject to any disclaimer, the term of this patent is extended or adjusted under 35 U.S.C. 154(b) by 1006 days.

(21) Appl. No.: 10/591,427

(22) PCT Filed: Jan. 28, 2005

(86) PCT No.: PCT/JP2005/001236

§ 371 (c)(1),
(2), (4) Date: Sep. 1, 2006

(87) PCT Pub. No.: WO2005/086091

PCT Pub. Date: Sep. 15, 2005

(65) Prior Publication Data

US 2007/0189586 A1    Aug. 16, 2007

(30) Foreign Application Priority Data

Mar. 4, 2004 (JP) .............................. 2004-061292

(51) Int. Cl.
*G06K 9/00* (2006.01)
*G06K 9/46* (2006.01)
*G06K 9/40* (2006.01)

(52) U.S. Cl. .................. 382/115; 382/190; 382/199; 382/275

(58) Field of Classification Search ......... 382/115–119, 382/124–127, 170, 190, 192, 197, 199, 224, 382/258, 259, 266, 275, 267, 298

See application file for complete search history.

(56) References Cited

U.S. PATENT DOCUMENTS 3,565,565 A * 2/1971 Reid .......................... 356/71
7,489,807 B2 * 2/2009 Hwang et al. ............... 382/124

FOREIGN PATENT DOCUMENTS

JP          63-308679         12/1988

(Continued)

OTHER PUBLICATIONS

Nobuyuki, O., "An Automatc Threshold Selection Method Based on Discriminant and Least Squares Criteria", The Institute of Electronics, Information and Communication Engineers Transactions ,vol. J63-D, No. 4, pp. 359-356.

*Primary Examiner*—Manav Seth
(74) *Attorney, Agent, or Firm*—Ostrolenk Faber LLP (57) ABSTRACT

A finger/palm print image processing system includes a frequency component analysis unit (11) and a frequency component judgment unit (12). The frequency component analysis unit (11) performs a frequency analysis for each of the small regions into which the finger/palm print image is divided and acquires frequency components representing the respective small regions. According to frequency component, the frequency component judgment unit (12) judges the clarity of the small region corresponding to the frequency component. The finger/palm print image indicates at least one of the finger print and the palm print. The Fourier transform is used for the frequency analysis. According to the frequency component and the result of the Fourier transform of a clear two-dimensional sinusoidal wave, the frequency component judge unit (12) judges the clarity of the small region corresponding to the frequency component. Thus, even when the background has a blocky portion or the finger/palm print region has an unclear portion due to a scratch, it is possible to judge a region where a clear ridgeline exists.

12 Claims, 8 Drawing Sheets

FOREIGN PATENT DOCUMENTS

| | | |
|---|---|---|
| JP | 08-110945 | 4/1996 |
| JP | 08-110949 | 4/1996 |
| JP | 08-129644 | 5/1996 |
| JP | 09-167230 | 6/1997 |
| JP | 2002-099912 | 4/2002 |
| JP | 2002-288641 | 10/2002 |
| JP | 2002-288672 | 10/2002 |
| JP | 2003-044856 | 2/2003 |
| WO | WO 01/55966 A1 | 8/2001 |

* cited by examiner

- 21: SMALL REGION OF INTEREST
- 27: REGION TO PERFORM A FREQUENCY ANALYSIS

FIG.6

- 31: BACKGROUND REGION
- 33: REGION WHERE RIDGELINES OF A FINGER/PALM PRINT ARE CLEAR
- 35: REGION WHERE RIDGELINES OF THE FINGER/PALM PRINT ARE UNCLEAR

FINGER/PALM PRINT IMAGE PROCESSING SYSTEM AND FINGER/PALM PRINT IMAGE PROCESSING METHOD

CROSS-REFERENCE TO RELATED APPLICATION(S)

The present application is a 35 U.S.C. §371 national phase conversion of PCT/JP2005/001236 filed Jan. 28, 2005, which claims priority of Japanese Application No. 2004-061292 filed Mar. 4, 2004 which is hereby incorporated by reference. The PCT International Application was published in the Japanese language.

TECHNICAL FIELD

The present invention relates to a finger/palm print image processing system and a finger/palm print image processing method, and particularly to a finger/palm print image processing system and a finger/palm print image processing method which are improved in functions of finger/palm print image processing.

BACKGROUND ART

An image including a finger print and/or a palm print (hereinafter referred to as a "finger/palm print") is subjected to predetermined image processing to recognize the finger/palm print image, in a known finger/palm print image processing technique.

JP-A-2002-99912 discloses an example of the finger/palm print image processing technique. In the image processing method according to this technique, noise is removed from an input image to restore an original image. The technique includes: a process for dividing an input image into plural blocks; a process for performing a Fourier transformation on each of the blocks obtained by the block dividing means; a process for estimating a power of an original image and a power of noise at each frequency, for setting a gain by use of estimation values of the two kinds of powers so as to take a smaller value as a relative size of the power of the noise at the frequencies increases greater, and for suppressing the power of the noise by multiplying an amplitude at a frequency corresponding to Fourier component information by the gain; a process for performing inverse Fourier transformation on a Fourier component the amplitude of which has been changed; and for combining images of the respective blocks transformed by the inverse Fourier transformation means, to construct an entire image after restoration.

This publication describes that according to this technique, a noise component is reduced by using a function which neglects very small components for image data after a Fourier transformation. Thereafter, an inverse Fourier transformation is performed to restore an original image, and thus, a ridgeline can be emphasized. The publication also describes that directions of respective pixels and regions are not examined. Hence, even if the size of very small blocks as units for dividing an image is set to be relatively large supposing a wide interval between stripe patterns, there is no adverse influence that measurement of a directivity in regions having a narrow interval between stripe patterns fails.

Among conventional finger/palm print image processing techniques, examples of techniques for judging a region of a finger/palm print image are described in JP-A-2003-44856, JP-A-8-110949, and JP-A-8-129644. In a background separation processing in a finger/palm print image comparison device described in JP-A-2003-44856, an input finger/palm print image is blurred by a Gauss transformation and then binarized, and a region transformed into black pixels is judged to be a region including a finger/palm print while a region transformed into white pixels is judged to be a background region.

In an image quality judgment method for a finger/palm print image according to a finger/palm print input method described in JP-A-8-110949, an input image is binarized and is judged as having a good image quality if the input image is binarized into black pixels at a ratio between 0.4 to 0.55. In another image quality judgment method for a finger/palm print image described in JP-A-8-129644, an input image is binarized and expressed by thin lines. End points and branch points are extracted. If density of the end points and branch points falls within a predetermined range, the input image is judged as having a good image quality.

Among conventional finger/palm print image processing techniques, examples of techniques for extracting ridgelines of a finger/palm print are described in JP-A-8-110945, JP-A-9-167230, JP-A-2002-288641, and JP-A-2002-288672. In an image quality judgment method for a finger/palm print image described in JP-A-8-110945, a finger/palm print image is binarized by obtaining a binary threshold value from a histogram of pixel values for each small region, thereby to extract a ridgeline image. In finger/palm print image processing devices described in JP-A-9-167230, JP-A-2002-288641, and JP-A-2002-288672, an input image is subjected to a frequency analysis for each small region, to detect plural ridgeline candidates. For each region, a substitute expressing a correct ridgeline is selected from the ridgeline candidates, based on continuities to ridgelines in peripheral regions, to extract a ridgeline image.

The technique described above for judging a region of a finger/palm print image involves a possibility of deterioration in accuracy of a region judgment if the background includes any contrasting density such as a dirt or noise. The other technique also described above for extracting ridgelines of a finger/palm print involves a possibility that correct ridgelines cannot be extracted and a fine structure of finger/palm print ridgelines cannot be extracted if a finger/palm print includes a wrinkle or scratch.

Patent Document 1: JP-A-2002-99912
Patent Document 2: JP-A-2003-44856
Patent Document 3: JP-A-8-110949
Patent Document 4: JP-A-8-129644
Patent Document 5: JP-A-8-110945
Patent Document 6: JP-A-9-167230
Patent Document 7: JP-A-2002-288641
Patent Document 8: JP-A-2002-288672
Non-Patent Document 1: Ohtsu Noriyuki, "Automatic Threshold Select Method Based on Discriminant and Least Square Criteria", The Institute of Electronics, Information and Communication Engineers Transactions, Vol. J63-D, No. 4, pp. 349-356

DISCLOSURE OF THE INVENTION

An object of the present invention is to provide a finger/palm print image processing system and a finger/palm print image processing method capable of correctly judging a region (hereinafter referred to as a "finger/palm print region") including a finger print and/or a palm print image (hereinafter a "finger/palm print") even when a background includes a contrasting density other than a finger/palm print.

Another object of the present invention is to provide a finger/palm print image processing system and a finger/palm print image processing method capable of correctly recognizing an unclear part even when a finger/palm print region includes an unclear part.

A still another object of the present invention is to provide a finger/palm print image processing system and a finger/palm print image processing method capable of correctly extracting a ridgeline and extracting a fine structure of ridgelines even when a finger/palm print region includes a wrinkle or scratch.

In the following, means for achieving the objects will be described referring to numerals/symbols used in the best mode for carrying out the invention. These numerals/symbols are added in parentheses to clarify correspondences between description in claims and the best mode for carrying out the invention. However, these numerals/symbols should not be taken into interpretation of technical scopes of the invention described in the claims.

To address the above objects, a finger/palm print image processing system according to the present invention comprises a frequency component analysis unit (11, 11a) and a frequency component judgment unit (12, 12a). The frequency component analysis unit (11, 11a) performs a frequency analysis on each of plural small regions into which a finger/palm print image is divided, to obtain plural frequency components representing each of the plural small regions. The frequency component judgment unit (12, 12a) judges clarity of the small regions corresponding to the frequency components, based on the frequency components. The finger/palm print image indicates at least one of a finger print and a palm print.

In the present invention, a finger/palm print image is divided into small regions, and frequency components representing each small region are obtained. Whether the frequency components are of a frequency observed in clear ridgelines or not is judged. Therefore, if any other contrasting density or noise than a finger/palm print exists in a background, finger/palm print regions can be judged correctly. Even if an unclear part exists in a finger/palm print region due to influences from noise or even if ridgelines have a fine structure, finger/palm print regions can be judged correctly.

In the above finger/palm print image processing system, the frequency component analysis unit (11, 11a) uses a Fourier transform as the frequency analysis. Based on the frequency components and a result of subjecting a clear two-dimensional sinusoidal wave to a Fourier transform, the frequency component judgment unit (12, 12a) judges clarity of the small region corresponding to the frequency components.

In the above finger/palm print image processing system, based on a result of the frequency analysis, the frequency component analysis unit (11, 11a) decides one point in a frequency space as the frequency components, and approximates the small region corresponding to the frequency components, to a representative point two-dimensional sinusoidal wave as a two-dimensional sinusoidal wave corresponding to the one point in the frequency space.

In the above finger/palm print image processing system, by use of a size of an amplitude of the representative point two-dimensional sinusoidal wave or by use of a ratio of the size of the amplitude of the representative point two-dimensional sinusoidal wave to a total sum of amplitudes of two-dimensional sinusoidal waves at a predetermined frequency band, the frequency component judgment unit (12, 12a) judges clarity of the small region corresponding to the frequency components.

In the above finger/palm print image processing system, the frequency component judgment unit (12, 12a) judges a small region to be a clear finger/palm print region if the small region satisfies either a condition that a size of an amplitude of the representative point two-dimensional sinusoidal wave is not smaller than a predetermined value or another condition that a value obtained by normalizing the size of the amplitude of the representative point two-dimensional sinusoidal wave of the small region by the greatest one among sizes of amplitude of the representative point two-dimensional sinusoidal waves of the plural small regions is not smaller than a predetermined value.

In the above finger/palm print image processing system, the frequency component analysis unit (11, 11a) obtains a first analysis result of performing a frequency analysis on a center portion of the small region, and a second analysis result of performing a frequency analysis on the small region including peripheral portions. The frequency component judgment unit (12, 12a) judges the small region to be a region having a fine structure if a difference exists between the first and second analysis results, or judges the small region to be a region having a monotonous flow if no difference exists between the first and second analysis results.

The above finger/palm print image processing system further comprises an image quality judgment unit (13) that judges quality of the finger/palm print image, based on judgment results of clarity of all the plural small regions.

In the above finger/palm print image processing system, the finger/palm print image is inputted from a finger/palm print image input device. The image quality judgment unit (13) judges image quality of a predetermined number of finger/palm print images, to judge quality of the finger/palm print image input device.

The above finger/palm print image processing system further comprises a ridgeline image extraction unit (15) that changes, for each of the plural small regions, a method of extracting ridgelines from the finger/palm print image in the small region, based on the judgment result of clarity of the small region, and extracts the ridgelines.

In the above finger/palm print image processing system, the frequency component analysis unit (11, 11a) inputs the finger/palm print image sequentially in units of the small regions, and performs the frequency analysis for each of the small regions.

In the above finger/palm print image processing system, the frequency component analysis unit (11, 11a) inputs the entire finger/palm print image. The unit divides the finger/palm print image into the small regions, and performs the frequency analysis.

To achieve the above objects, a finger/palm print image processing method according to the present invention comprises: a step (a) of performing a frequency analysis on each of plural small regions into which a finger/palm print image is divided, to obtain plural frequency components representing each of the plural small regions; and a step (b) of judging clarity of the small regions corresponding to the frequency components, based on the frequency components. Here the finger/palm print image indicates at least one of a finger print and a palm print.

In the above finger/palm print image processing method, the step (a) includes a step (a1) of using a Fourier transform as the frequency analysis. The step (b) includes a step (b1) of judging clarity of the small region corresponding to the frequency components, based on the frequency components and a result of subjecting a clear two-dimensional sinusoidal wave to a Fourier transform.

In the above finger/palm print image processing method, the step (a) includes a step (a2) of deciding one point in a frequency space as the frequency components, based on a result of the frequency analysis, and a step (a3) of approximating the small region corresponding to the frequency components, to a representative point two-dimensional sinusoidal wave as a two-dimensional sinusoidal wave corresponding to the one point in the frequency space.

In the above finger/palm print image processing method, the step (b) includes a step (b2) of making a judgment either by use of a size of an amplitude of the representative point two-dimensional sinusoidal wave or by use of a ratio of the size of the amplitude of the representative point two-dimensional sinusoidal wave to a total sum of amplitudes of two-dimensional sinusoidal waves at a predetermined frequency band.

In the above finger/palm print image processing method, the step (b2) includes a step (b21) of judging a small region to be a clear finger/palm print region if the small region satisfies either a condition that a size of an amplitude of the representative point two-dimensional sinusoidal wave is not smaller than a predetermined value or another condition that a value obtained by normalizing the size of the amplitude of the representative point two-dimensional sinusoidal wave of the small region by the greatest one among sizes of amplitude of the representative point two-dimensional sinusoidal waves of the plural small regions is not smaller than a predetermined value.

In the above finger/palm print image processing method, the step (a) includes a step (a4) of obtaining a first analysis result performing a frequency analysis on a center portion of the small region, and a second analysis result performing a frequency analysis on the small region including peripheral portions. The step (b) includes a step (b3) of judging the small region to be a region having a fine structure if a difference exists between the first and second analysis results, or judging the small region to be a region having a monotonous flow if no difference exists between the first and second analysis results.

The above finger/palm print image processing method further comprises a step (c) of judging quality of the finger/palm print image, based on judgment results of clarity of all the plural small regions.

In the above finger/palm print image processing method, the step (a) includes a step (a5) of obtaining the finger/palm print image from a finger/palm print image input device. The step (b) includes a step (b4) of judging image quality of a predetermined number of finger/palm print images, to judge quality of the finger/palm print image input device.

The above finger/palm print image processing method further comprises a step (d) of changing, for each of the plural small regions, a method of extracting ridgelines from the finger/palm print image in the small region, based on the judgment result of clarity of the small region, and extracting the ridgelines.

In the above finger/palm print image processing method, the step (a) includes a step (a6) of inputting the finger/palm print image sequentially in units of the small regions. The frequency analysis is performed for each of the small regions.

In the above finger/palm print image processing method, the step (a) includes a step (a7) of inputting the entire finger/palm print image, and a step (a8) of dividing the finger/palm print image into the small regions. The frequency analysis is performed for each of the small regions.

To solve the above objects, a program according to the present invention makes a computer execute a method, comprising: a step (a) of performing a frequency analysis on each of plural small regions into which a finger/palm print image is divided, to obtain plural frequency components representing each of the plural small regions; and a step (b) of judging clarity of the small regions corresponding to the frequency components, based on the frequency components. The finger/palm print image indicates at least one of a finger print and a palm print.

In the above program, the step (a) includes a step (a1) of using a Fourier transform as the frequency analysis. The step (b) includes a step (b1) of judging clarity of the small region corresponding to the frequency components, based on the frequency components and a result of subjecting a clear two-dimensional sinusoidal wave to a Fourier transform.

In the above program, the step (a) includes a step (a2) of deciding one point in a frequency space as the frequency components, based on a result of the frequency analysis, and a step (a3) of approximating the small region corresponding to the frequency components, to a representative point two-dimensional sinusoidal wave as a two-dimensional sinusoidal wave corresponding to the one point in the frequency space.

In the above program, the step (b) includes a step (b2) of making a judgment either by use of a size of an amplitude of the representative point two-dimensional sinusoidal wave or by use of a ratio of the size of the amplitude of the representative point two-dimensional sinusoidal wave to a total sum of amplitudes of two-dimensional sinusoidal waves at a predetermined frequency band.

In the above program, the step (b2) includes a step (b21) of judging a small region to be a clear finger/palm print region if the small region satisfies either a condition that a size of an amplitude of the representative point two-dimensional sinusoidal wave is not smaller than a predetermined value or another condition that a value obtained by normalizing the size of the amplitude of the representative point two-dimensional sinusoidal wave of the small region by the greatest one among sizes of amplitude of the representative point two-dimensional sinusoidal waves of the plural small regions is not smaller than a predetermined value.

In the above program, the step (a) includes a step (a4) of obtaining a first analysis result performing a frequency analysis on a center portion of the small region, and a second analysis result performing a frequency analysis on the small region including peripheral portions. The step (b) includes a step (b3) of judging the small region to be a region having a fine structure if a difference exists between the first and second analysis results, or judging the small region to be a region having a monotonous flow if no difference exists between the first and second analysis results.

The above program further comprises a step (c) of judging quality of the finger/palm print image, based on judgment results of clarity of all the plural small regions.

In the above program, the step (a) includes a step (a5) of obtaining the finger/palm print image from a finger/palm print image input device. The step (b) includes a step (b4) of judging image quality of a predetermined number of finger/palm print images, to judge quality of the finger/palm print image input device.

The above program further comprises a step (d) of changing, for each of the plural small regions, a method of extracting ridgelines from the finger/palm print image in the small region, based on the judgment result of clarity of the small region, and extracting the ridgelines.

In the above program, the step (a) includes a step (a6) of inputting the finger/palm print image sequentially in units of the small regions. The frequency analysis is performed for each of the small regions.

In the above program, the step (a) includes a step (a7) of inputting the entire finger/palm print image, and a step (a8) of dividing the finger/palm print image into the small regions. The frequency analysis is performed for each of the small regions.

According to the present invention, if any other contrasting density, such as a stain, than a finger/palm print exists in a background, finger/palm print regions can be judged correctly. If an unclear part exists in a finger/palm print region due to influences from noise, finger/palm print regions can be judged correctly. If a part including a wrinkle or scratch or ridgelines have a fine structure, ridgelines can be extracted correctly.

EXPLANATION OF REFERENCE NUMERALS 1, 1a: Finger/palm print image processing system
3: Finger/palm print image input device
4, 4a: Finger/palm print image processing device
5, 5a: Output device
11, 11a: Frequency component analysis unit
12, 12a: Frequency component judgment unit
13: Image quality judgment unit
15: Ridgeline restoration unit
21: Small region
21a, 21b: Entire region
23: Ridgeline
25: Two-dimensional sinusoidal wave
27: Region
28a: Peripheral portion
31: Background region
33: Region including clear ridgelines
35: Region including unclear ridgelines
41, 42, 44, 45: Small region

BEST MODE FOR CARRYING OUT THE INVENTION

Embodiments of a finger/palm print image processing system and a finger/palm print image processing method according to the present invention will now be described with reference to the appended drawings.

First Embodiment

A first embodiment of the finger/palm print image processing system and finger/palm print image processing method according to the present invention will be described first.

At first, description will be made of a structure of the first embodiment of the finger/palm print image processing system according to the present invention.

Figure 1:
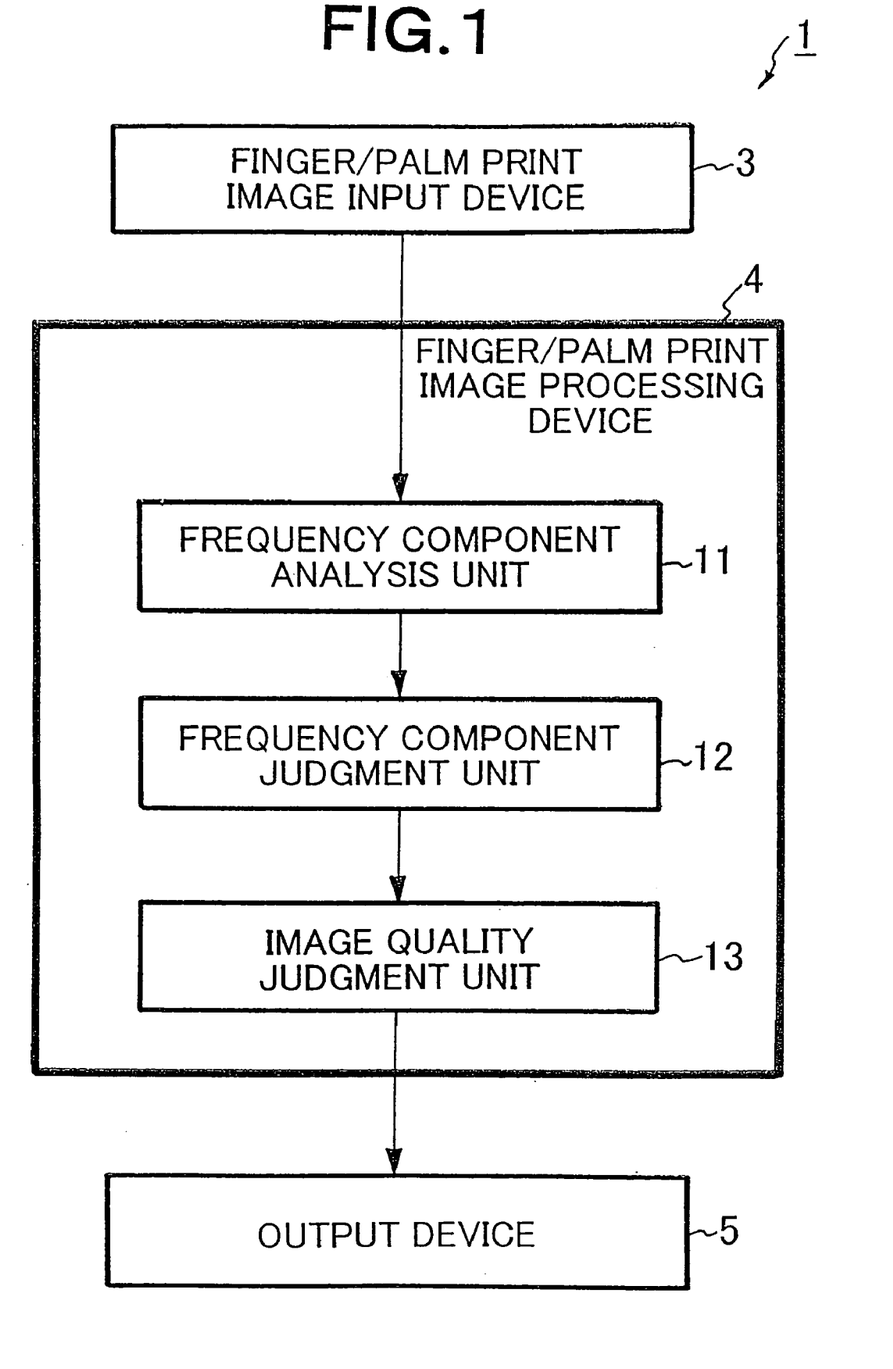
FIG. 1 is a block diagram showing a structure of a first embodiment of a finger/palm print image processing system according to the present invention.

FIG. 1 is a block diagram showing a structure of the first embodiment of the finger/palm print image processing system according to the present invention. The finger/palm print image processing system 1 of the present invention has a finger/palm print image input device 3, a finger/palm print image processing device 4, and an output device 5.

The finger/palm print image input device 3 acquires finger/palm print image data expressing a finger/palm print image, and outputs the finger/palm print image data to the finger/palm print image processing device 4. Examples of the finger/palm print image input device 3 are a finger/palm print sensor or a scanner. The finger/palm print image input device 3 and finger/palm print image processing device 4 may be connected to each other by a network or by a normal connection cable.

The finger/palm print image processing device 4 obtains finger/palm print image data. Further, the finger/palm print image processing device 4 outputs to the output device 5 an image processing result on which predetermined image processing has been performed or a judgment result obtained by performing a predetermined judgment by use of the image processing result. Examples of the finger/palm print image processing device 4 are a personal computer, work station, and a portable information terminal. However, data which has already been inputted and stored into a storage unit (not shown) in the finger/palm print image processing device 4 can be used as the finger/palm print image data. As for an output destination of the image processing result or the judgment result, the result can be stored into a storage unit (not shown) of the finger/palm print image processing device 4 or outputted to another information processing device (not shown) through a network (not shown). An example of another information processing device noted above is an authentication device which authenticates a person by a finger/palm print.

The output device 5 outputs an image processing result or judgment result from the finger/palm print image processing device 4. Examples of the output device 5 are a display and a printer. Please note that the output device 5 and finger/palm print image processing device 4 may be connected to each other via a network or by a normal connection cable.

The finger/palm print image processing device 4 has a frequency component analysis unit 11 as a program, a frequency component judgment unit 12, and an image quality judgment unit 13.

The frequency component analysis unit 11 takes in finger/palm print image data from the finger/palm print image input device 3. The frequency component analysis unit 11 divides the finger/palm print image of the finger/palm print image data into plural small regions. For each of the plural small regions, the frequency component analysis unit 11 analyzes frequency components of the finger/palm print image. An analysis result for each small region is outputted to the frequency component judgment unit 12. The analysis result includes frequency components (vertical and horizontal frequencies) of a small region, and amplitudes thereof.

According to the method of dividing the finger/palm print image into the small regions, the image is divided into arbitrary units for each of which whether a region including a finger/palm print is clear or not should be judged. As an analysis method, for example, an orthogonal transform or autocorrelation such as a two-dimensional Fourier transform, discreet cosine transform, Walsh transform, or wavelet transform can be used for each of the plural small regions.

The frequency component judgment unit 12 judges whether each small region is a clear finger/palm print region or not, from results analyzed by the frequency component analysis unit 11. A judgment result for each small region is outputted to the image quality judgment unit 13. The judgment method is to judge, for example, whether a frequency component representing each small region satisfies a predetermined condition which is observed if ridgelines of a finger/palm print appear clearly.

The image quality judgment unit 13 totalizes the judgment results for respective small regions obtained by the frequency component judgment unit 12, and judges whether the entire finger/palm print image of the inputted finger/palm print image data is clear. A judgment result thereof is outputted to the output device 5.

Operation of the first embodiment of the finger/palm print image processing system according to the present invention will be described next.

Figure 2:
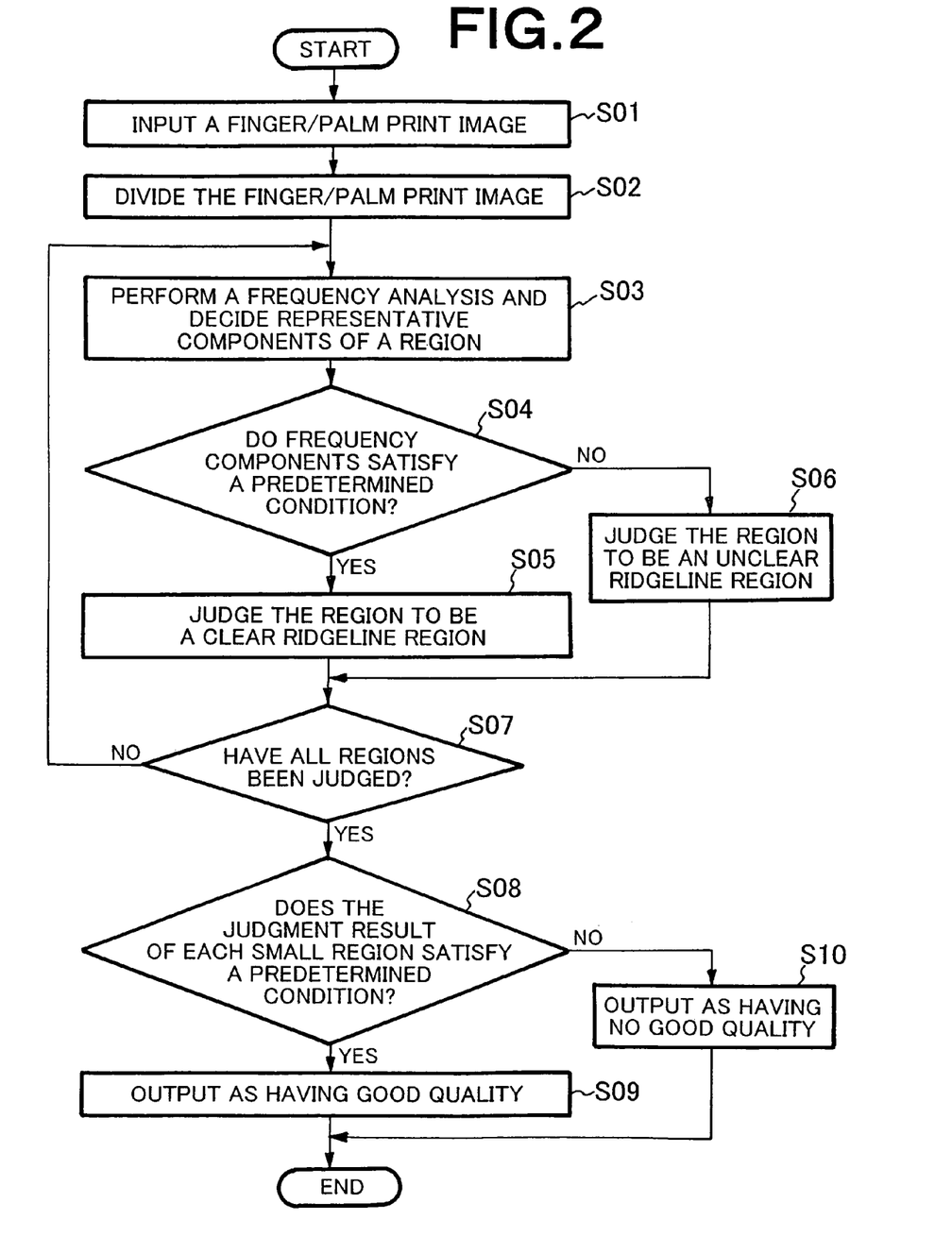
FIG. 2 is a flowchart showing operation of the first embodiment of the finger/palm print image processing system according to the present invention.

FIG. 2 is a flowchart showing operation of the first embodiment of the finger/palm print image processing system (or the first embodiment of the finger/palm print image processing method) according to the present invention.

(1) Step S01

The finger/palm print image input device 3 obtains finger/palm print image data indicative of a finger/palm print image. The finger/palm print image processing device 4 is inputted with finger/palm print image data from the finger/palm print image input device 3.

(2) Step S02

The frequency component analysis unit 11 divides a finger/palm print image of the finger/palm print image data into small regions. According to the method of dividing the image into small regions, the image is divided into units for each of which whether a region including a finger/palm print is clear or not is judged. For example, the image is divided into a square lattice of a predetermined size.

(3) Step S03

The frequency component analysis unit 11 performs a frequency analysis for each of divided small regions, and detects frequency components (vertical and horizontal frequencies) of the image of each small region and amplitudes thereof. Then the unit 11 determines the frequency components representing each of the small regions. For example, a frequency analysis is performed by a two-dimensional Fourier transform, for each of the small regions.

Figure 3:
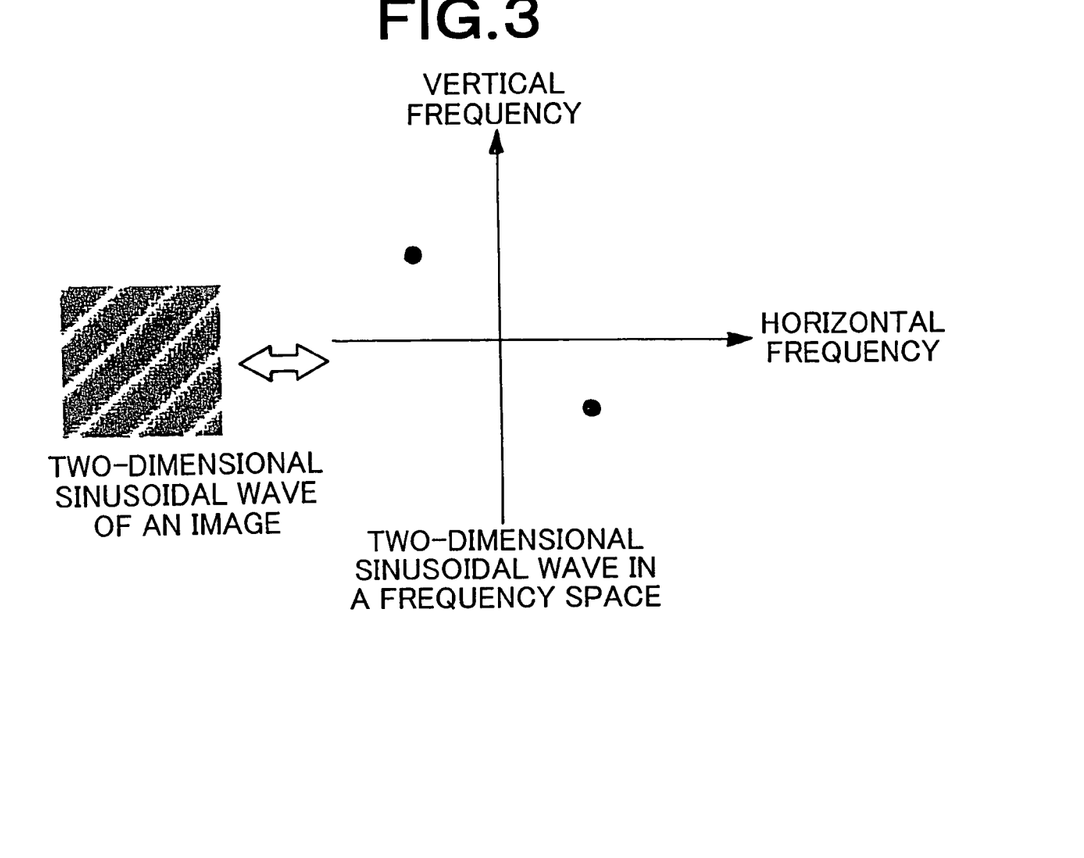
FIG. 3 shows an image indicating a two-dimensional sinusoidal wave in a small region and a graph showing a two-dimensional sinusoidal wave in a frequency space obtained by subjecting the two-dimensional sinusoidal wave to a two-dimensional Fourier transform.

FIG. 3 shows an image indicative of a two-dimensional sinusoidal wave (left side of the figure) and a graph (right side of the figure) indicative of a resultant two-dimensional sinusoidal wave in a frequency space obtained by subjecting the former two-dimensional sinusoidal wave to a two-dimensional Fourier transform. In the graph in the right side of the figure, the vertical axis represents the vertical frequency and the horizontal axis represents the horizontal frequency. As shown in the figure, a pair of points express one two-dimensional sinusoidal wave in the frequency space obtained by a two-dimensional Fourier transform.

Figure 4:
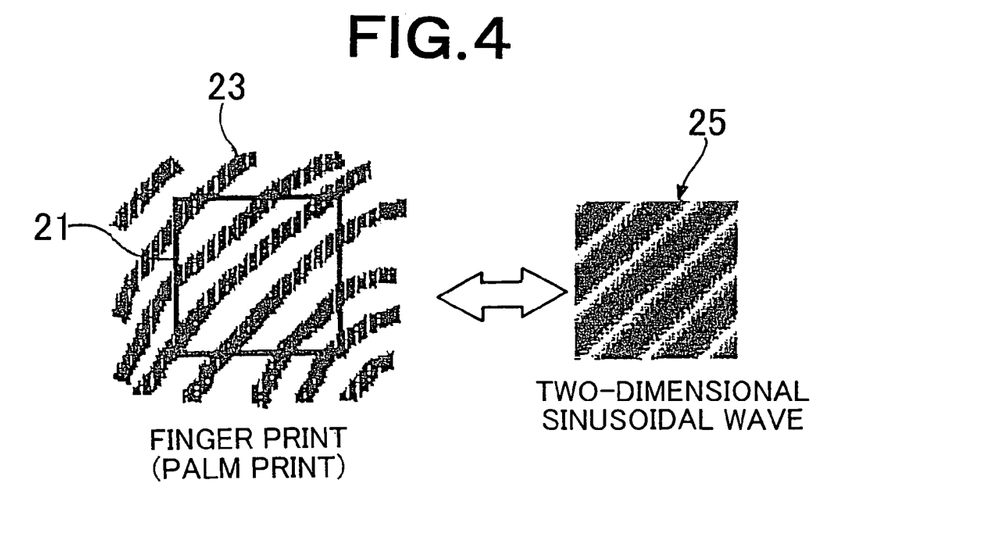
FIG. 4 shows ridgelines in a small region of a finger/palm print image and a two-dimensional sinusoidal wave.

FIG. 4 shows ridgelines 23 (left side of the figure) and a two-dimensional sinusoidal wave (right side of the figure) in a small region 21 of a finger/palm print image. As shown in the figure, if the small region 21 is so small that the ridgelines 23 can be regarded as parallel lines, the ridgelines 23 of the finger/palm print in the small region 21 can be approximated to be a two-dimensional sinusoidal wave 25.

From FIGS. 3 and 4, a two-dimensional Fourier transform is performed on the small region 21 which is so small that the ridgelines 23 can be regarded as parallel lines. Then, a point appears corresponding to the two-dimensional sinusoidal wave 25 in a frequency space. This point can be selected as a representative point. Further, the ridgelines 23 are approximated to be a two-dimensional sinusoidal wave corresponding to the one point on the frequency space. If there are plural points in the small region 21 in the frequency space, the one point the two-dimensional sinusoidal wave of which (in at least one of a real space and a frequency space; the same thing applies to the following) has the greatest amplitude is selected as a representative point.

The method of selecting a representative point in case of plural points existing in a small region 21 in a frequency space may use a method as described in JP-A-9-167230, 2002-288641, and 2002-288672 in which continuities between frequency components of each small region and frequency components of peripheral regions are evaluated, to select such frequency components representing each region that make ridgelines of a finger/palm print continuous. Thus, a representative point may be selected based on continuities to peripheral regions.

Figure 5:
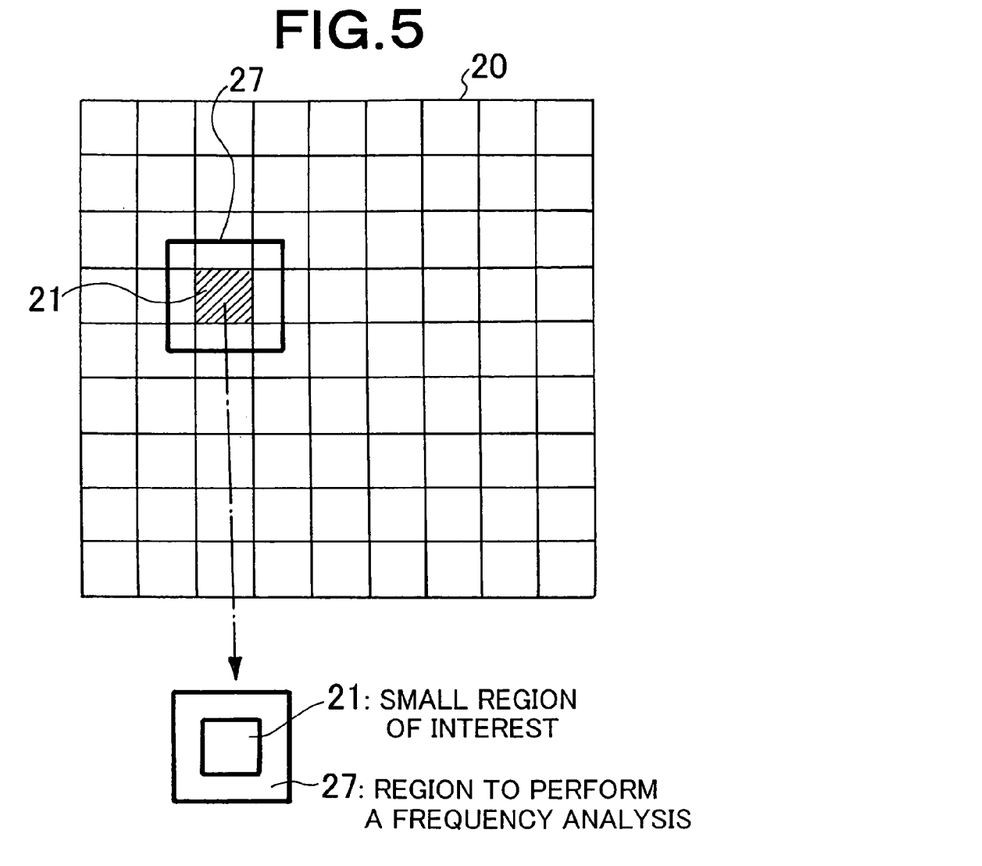
FIG. 5 shows a region to be subjected to a frequency analysis in a finger/palm print image.

FIG. 5 shows regions to be subjected to a frequency analysis in a finger/palm print image. If a frequency analysis is performed on each small region 21 of a finger/palm print image 20, the range where the frequency analysis is effected may be a slightly larger region 27 including the small region 21. In this case, stability of judgment results improves.

To determine periodicity of ridgelines of a finger/palm print, the range (small region 21 or region 27) to be subjected to a frequency analysis is desirably large enough to include at least two ridgelines or so. If the range to be subjected to frequency analysis is too large, curvature of ridgelines influences strongly. Therefore, the range is desirably not greater than such a size that includes four ridgelines. To improve stability of a frequency analysis, image processing for blurring peripheral parts may be carried out before performing a frequency analysis.

(4) Step S04

Referring to FIG. 2, the frequency component judgment unit 12 judges whether or not frequency components representing each small region, which have been decided by the frequency component analysis unit 11, satisfy a predetermined condition which is observed if ridgelines of a finger/palm print appear clearly, for each small region.

The predetermined condition which is observed if ridgelines of a finger/palm print appear clearly is, for example, a case that the amplitude of a two-dimensional sinusoidal wave representing (approximating) each small region is greater than a predetermined reference value. In this case, the frequency component judgment unit 12 judges that the small region includes a finger/palm print clearly.

On the following reasons, a clear finger/palm print can be judged as existing if the amplitude of a two-dimensional sinusoidal wave is greater.

Figure 6:
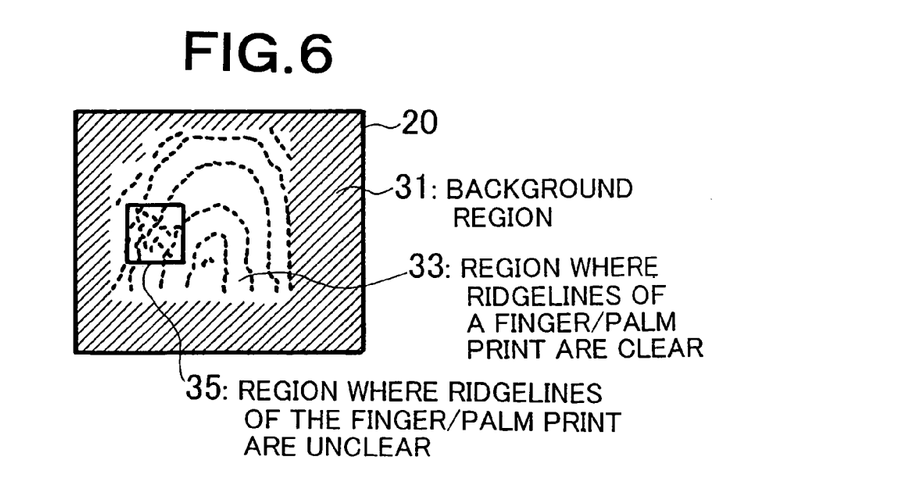
FIG. 6 shows an example of a finger/palm print image.

FIG. 6 shows an example of a finger/palm print image. An inputted finger/palm print image 20 can be classified into a background region 31 including no finger/palm print, a region 33 where ridgelines of a finger/palm print exist and are clear, and a region 35 where ridgelines of a finger/palm print exist and are unclear due to a scratch or dirt.

At this time, ridgelines of the finger/palm print can be approximated to a two-dimensional sinusoidal wave. Therefore, in the region 33 where ridgelines of the finger/palm print are clear, the amplitude of a two-dimensional sinusoidal wave which approximates to ridgelines in the region is great. However, the background region 31 including no ridgelines of the finger/palm print includes nothing that can be expressed by a two-dimensional sinusoidal wave. Therefore, the two-dimensional sinusoidal wave must have no amplitude or a very small amplitude. In the region 35 where ridgelines of the finger/palm print are unclear due to a scratch or dirt, ridgelines cannot clearly be approximated to a two-dimensional sinusoidal wave. Therefore, the two-dimensional sinusoidal wave which approximates the ridgelines in this region must have a smaller amplitude. That is, existence of a clear finger/palm print can be judged if the amplitude of a two-dimensional sinusoidal wave is great.

If the finger/palm print is clear, the ridgelines of the finger/palm print are similar to a two-dimensional sinusoidal wave as a clear waveform. Otherwise, if the finger/palm print is unclear, the ridgelines of the finger/palm print are not much similar to a two-dimensional sinusoidal wave as a clear waveform. Accordingly, a judgment according to the amplitude of a similar two-dimensional sinusoidal wave as described above or the size of the amplitude of a frequency component corresponding to the two-dimensional sinusoidal wave can be considered as a judgment method according to a degree of similarity between ridgelines of a finger/palm print in an inputted image and a two-dimensional sinusoidal wave.

In the frequency component judgment unit 12, the size of the amplitude of a two-dimensional sinusoidal wave is directly influenced by a contrasting density of an inputted image. Therefore, if an input image is considered as having a variation in the density, a judgment as described above may be carried out after normalizing the amplitude of a two-dimensional sinusoidal wave by such a two-dimensional sinusoidal wave that has the greatest amplitude among two-dimensional sinusoidal waves representing each region.

A judgment may alternatively be made depending on whether or not a ratio of a size of a two-dimensional sinusoidal wave representing a region to a sum of amplitudes of all frequencies exceeds a predetermined ratio or whether or not a ratio of a size of a two-dimensional sinusoidal wave representing a region to a sum of sizes of amplitudes within a frequency band which a ridgeline of a finger/palm print can have exceeds a predetermined ratio.

A reference for the judgment is not limited to comparison with a predetermined value but a statistical judgment method such as a method described in the document "Ohtsu Noriyuki, "Automatic Threshold Select Method Based on Discriminant and Least Square Criteria", The Institute of Electronics, Information and Communication Engineers Transactions, Vol. J63-D, No. 4, pp. 349-356" can be used to decide a threshold value to judge a region where a finger/palm print exists clearly. Or a combination thereof may be used to make a judgment.

(5) Step S05

Referring to FIG. 2, the frequency component judgment unit 12 judges a small region to be a region including a clear finger/palm print if a predetermined condition is satisfied (Step S04: Yes).

(6) Step S06

The frequency component judgment unit 12 judges a small region to be not a region including a clear finger/palm print if a predetermined condition is not satisfied (Step S04: No).

(7) Step S07

The frequency component judgment unit 12 checks whether or not all the small regions have been judged. If there still is a small region which has not yet been checked, the unit 12 returns to the step S03 and checks a next region. Based on a judgment thereof, the frequency component judgment unit 12 outputs to the image quality judgment unit 13 a judgment result indicating whether or not each small region is a region including a vivid finger/palm print. Alternatively, the judgment result can be outputted to the output device 5.

In this case, regions where ridgelines of a finger/palm print exist clearly and the other regions are judged. However, a background region can be judged by use of a method according to JP-A-2003-44856 or the like, and remaining part can be judged to be regions where ridgelines of a finger/palm print exist clearly or the other regions by use of frequency components. In that case, as shown in FIG. 6, regions can be classified into a background region 31, an region 33 where ridgelines are clear, and a region 35 where ridgelines are unclear. As a result of this, a judgment can be made by a ratio at which the remaining part is occupied by a clear region. Influences from variants in size of a finger/palm print region in an inputted finger/palm print image can be eliminated.

Regions where ridgelines are clear and unclear need not judged only by a predetermined threshold value but values used for various judgments as described above and/or values obtained by transforming values used for determination methods thereof by a predetermined function can be outputted to the output device 5.

(8) Step S08

Referring to FIG. 2, the image quality judgment unit 13 totalizes determination results for the respective small regions from the frequency component judgment unit 12, and judges whether or not a predetermined condition is satisfied. An example of the predetermined condition is a case that a ratio of those small regions that are judged to be of a clear finger/palm print image by the frequency component judgment unit 12 to the plural small regions is not smaller than a predetermined ratio. In that case, the image quality judgment unit 13 judges that an inputted finger/palm print image is good.

(9) Step S09

The image quality judgment unit 13 judges the entire of an inputted finger/palm print image to be good if a predetermined condition is satisfied (step S08: Yes). The judgment result is outputted to the output device 5.

(10) Step S10

The image quality judgment unit 13 judges the entire of an inputted finger/palm print image to be no good if a predetermined condition is not satisfied (step S08: No). The judgment result is outputted to the output device 5.

The judgment results outputted from the steps S07, S09, and S10 are displayed and outputted by the output device 5.

The present embodiment is configured such that for each small region of an inputted finger/palm print image, whether frequency components representing the region express a clear ridgeline of a finger/palm print or not. Therefore, whether each small region is clearly stamped or not can be judged. In addition, the embodiment is configured such that judgment results for respective small regions are totalized to make a judgment of an inputted image. Therefore, the entire of the inputted image can be judged.

Further, not only whether each inputted finger/palm print image is good or not is judged but also whether a predetermined number of inputted finger/palm print images are good or not is judged. If images are judged to be good at a predetermined ratio or higher, the finger/palm print image input device 3 such as a finger/palm print scanner can be judged to be good. That is, the embodiment can be used for judging whether finger/palm print image input device 3 works good or not.

Second Embodiment

A second embodiment of the finger/palm print image processing system and a finger/palm print image processing method according to the present invention will now be described.

At first, description will be made of a structure of the second embodiment of the finger/palm print image processing system according to the present invention.

Figure 7:
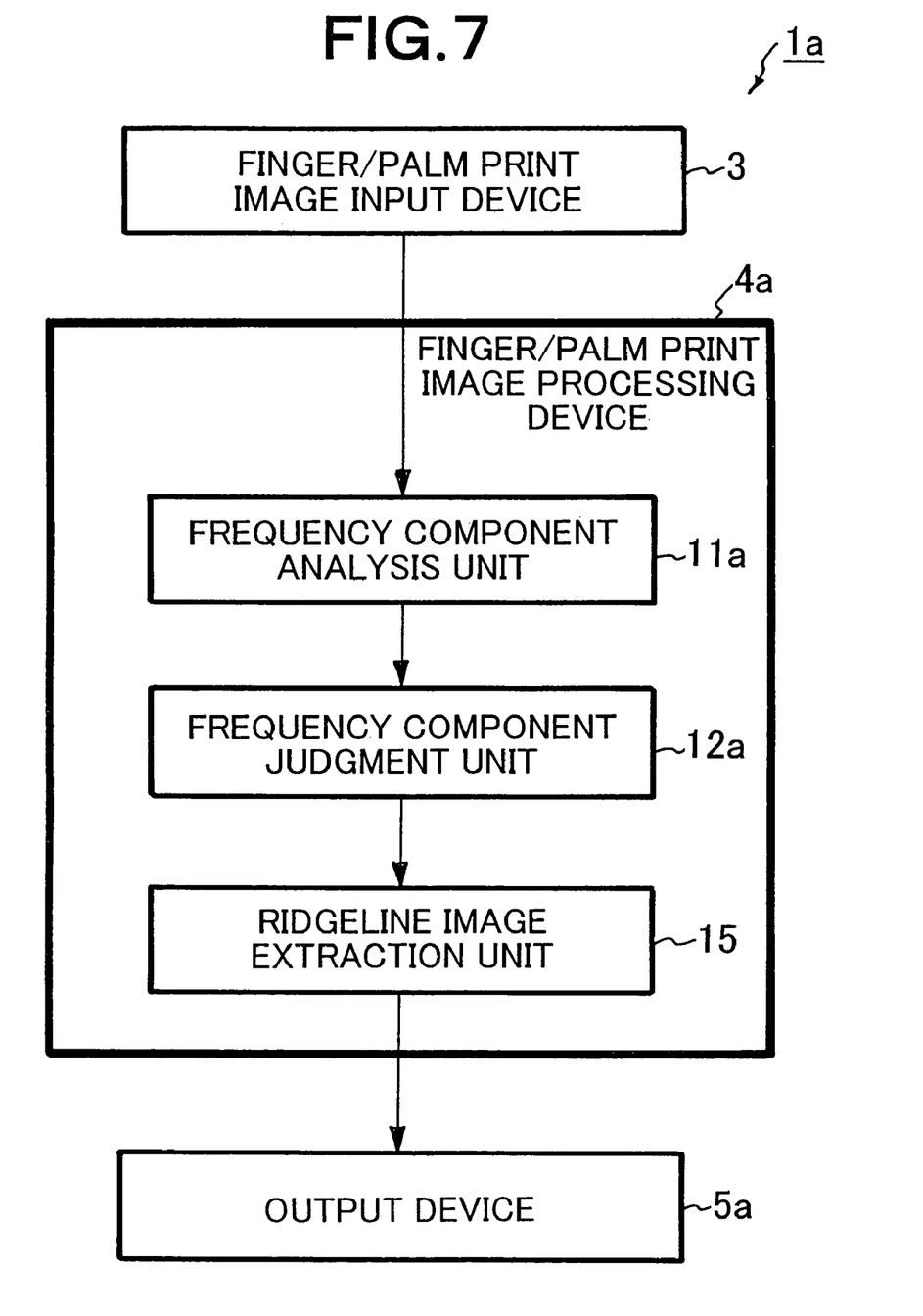
FIG. 7 is a block diagram showing a structure of a second embodiment of a finger/palm print image processing system according to the present invention.

FIG. 7 is a block diagram showing a structure of the second embodiment of the finger/palm print image processing system according to the present invention. The finger/palm print image processing system 1a of the present invention has a finger/palm print image input device 3, a finger/palm print image processing device 4a, and an output device 5a.

The finger/palm print image input device 3 is the same as that in the first embodiment, and description thereof will be omitted.

The finger/palm print image processing device 4a obtains finger/palm print image data. Further, the finger/palm print image processing device 4a divides the obtained finger/palm print image data into plural small regions. For each of the small regions, the finger/palm print image processing device 4a performs image processing to judge the state of each region. Based on judgment results thereof, a restoration method for ridgelines is decided for each small region, and ridgelines are extracted and restored. Extraction/restoration results are outputted to the output device 5a. Examples of the finger/palm print image processing device 4a are a personal computer, work station, and portable information terminal. However, data which has already been inputted and stored into a storage unit (not shown) in the finger/palm print image processing device 4a can be used as the finger/palm print image data. As for an output destination of the restoration result, the result can be stored into a storage unit (not shown) in the finger/palm print image processing device 4a or outputted to another information processing device (not shown) through a network (not shown). An example of another information processing device noted above is an authentication device which authenticates a person by a finger/palm print.

The output device 5a outputs an extraction/restoration result from the finger/palm print image processing device 4a. Examples of the output device 5a are a display and a printer. Note that the output device 5a and finger/palm print image processing device 4a may be connected to each other via a network or by a normal connection cable.

The finger/palm print image processing device 4a has a frequency component analysis unit 11a as a program, a frequency component judgment unit 12a, and a ridgeline image extraction unit 15.

The frequency component analysis unit 11a takes in finger/palm print image data from the finger/palm print image input device 3. The frequency component analysis unit 11a divides the finger/palm print image of the finger/palm print image data into plural small regions. For each of the plural small regions, the frequency component analysis unit 11a analyzes frequency components of the finger/palm print image. Alternatively, for each small region, frequency components are analyzed separately in a case of only the center portion of the small region and another case of the (entire) small region including peripheral portions. An analysis result for each small region is outputted to the frequency component judgment unit 12. Since the method for dividing an image into small regions and the analysis method are the same as those in the first embodiment, and therefore, description thereof will be omitted herefrom.

The frequency component judgment unit 12a judges states of respective small regions, based on the results analyzed by the frequency component analysis unit 11a. That is, if analysis results concern representative frequency components for each small region, whether each small region is a region including a clear finger/palm print is judged. If analysis results concern frequency components in each of the case of only the center portion and the other case of the entire, whether each small region is a region having a monotonous structure or an region having a fine structure is determined. Based on the analysis results, both judgments can be made.

A judgment result for each small region is outputted to the ridgeline image extraction unit 15. Concerning a region including a clear finger/palm print, the judgment method is to judge, for example, whether a frequency component representing each small region satisfies a predetermined condition which is observed if ridgelines of a finger/palm print appear clearly. Concerning a region having a fine structure, a judgment is made about whether or not a relationship between frequency components at the center portion of the small region and frequency components of the entire satisfies a predetermined condition which is observed if a small region has a fine structure.

Based on the judgment result obtained for each small region by the frequency component judgment unit 12a, the ridgeline image extraction unit 15 selects a proper ridgeline extraction/restoration method for each small region, and extracts/restores an image of ridgelines. Extraction/restoration results are outputted to the output device 5a. As the extraction method, for example, the methods according to JP-A-8-110945 and JP-A-9-167230 can be used.

Operation of the second embodiment of the finger/palm print image processing system according to the present invention will be described next.

Figure 8:
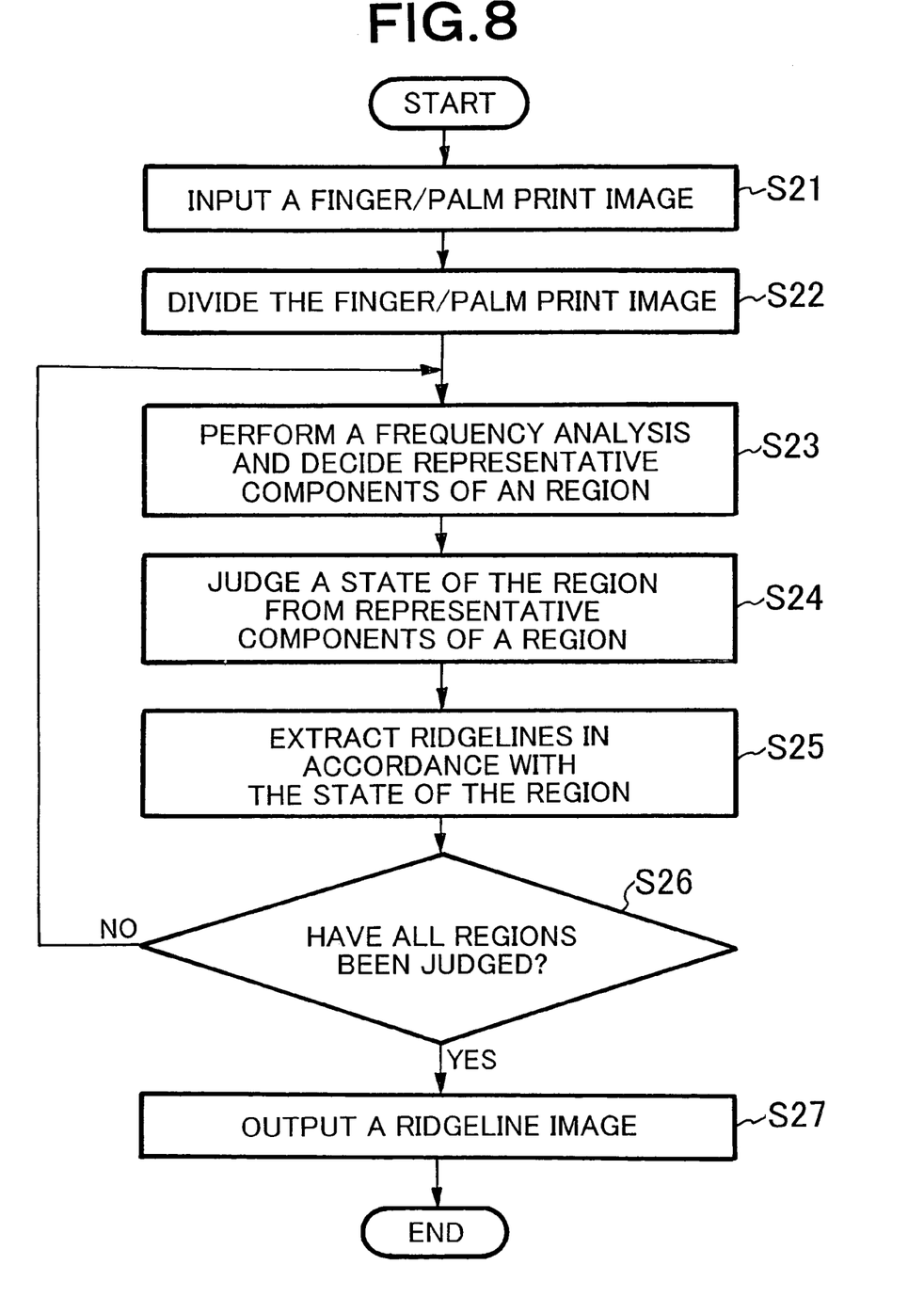
FIG. 8 is a flowchart showing operation of the second embodiment of the finger/palm print image processing system (second embodiment of a finger/palm print image processing method) according to the present invention.

FIG. 8 is a flowchart showing operation of the second embodiment of the finger/palm print image processing system (or the second embodiment of the finger/palm print image processing method) according to the present invention.

(1) Step S21

The finger/palm print image input device 3 obtains finger/palm print image data indicative of a finger/palm print image. The finger/palm print image processing device 4a is inputted with finger/palm print image data from the finger/palm print image input device 3.

(2) Step S22

The frequency component analysis unit 11a divides a finger/palm print image of the finger/palm print image data into small regions. According to the method of dividing the image into small regions, the image is divided into units for each of which whether a region including a finger/palm print is clear or not is judged. For example, the image is divided into a square lattice of a predetermined size.

(3) Step S23

The frequency component analysis unit 11a performs a frequency analysis for each of divided small regions, and detects frequency components (vertical and horizontal frequencies) of the image of each small region and amplitudes thereof. Further, frequency components representing the small region are decided. Alternatively, for each small region, frequency analyses are performed separately in a case of only the center portion of the small region and another case of the (entire) small region including peripheral portions, to detect frequency components (vertical and horizontal frequency components) of the center portion and the entire of the small region, and amplitudes thereof. Then, frequency components representing the center portion of the small region and frequency components in the case of the entire of the small region may be decided. Since the method for deciding the frequency components is the same as that in the first embodiment (in the description of the step S23), the description thereof will be omitted.

(4) Step S24

For each small region, the frequency component judgment unit 12a judges whether or not a predetermined condition is satisfied by frequency components decided for each small region to represent the small region by the frequency component analysis unit 11a or by frequency components representing the center portion of each small region and frequency components representing the entire of the small region.

At this time, in the case of a judgment concerning representative frequency components for each small region, whether each small region is a region including a clear finger/palm print is judged. Since the judgment method thereof is the same as that in the first embodiment (in the description of the step S04), description thereof will be omitted.

In the other case of a judgment concerning frequency components representing the center portion of each small region and frequency components representing the entire thereof, the judgment is made as follows. That is, for each small region, frequency components of the center portion of each small region and frequency components of the entire thereof are compared with each other. As a result of comparison, if a difference between both does not fall within a predetermined range, the small region can be judged to be a region having a fine structure. If the difference falls within the predetermined range, the small region can be judged to be a region having a monotonous flow. The reasons will be described with reference to FIGS. 9 to 14.

Figure 9:
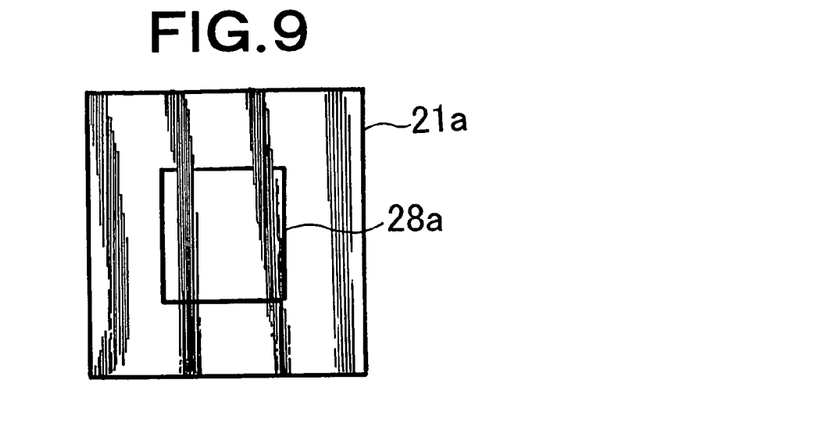
FIG. 9 shows an example of a finger/palm print image in a small region.
Figure 10:
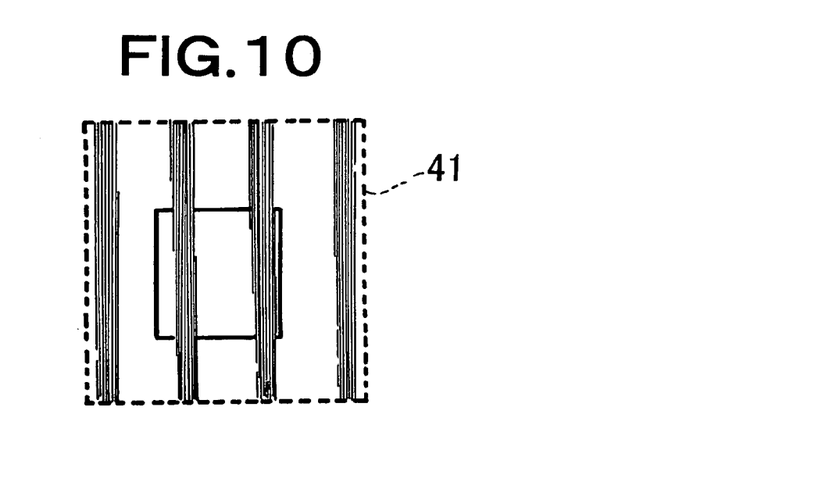
FIG. 10 shows an example of a finger/palm print image in a small region.
Figure 11:
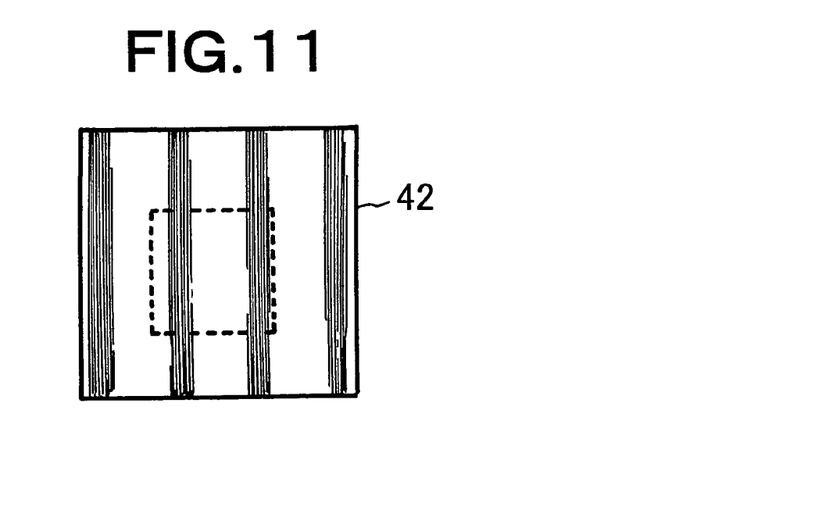
FIG. 11 shows an example of a finger/palm print image in a small region.
Figure 12:
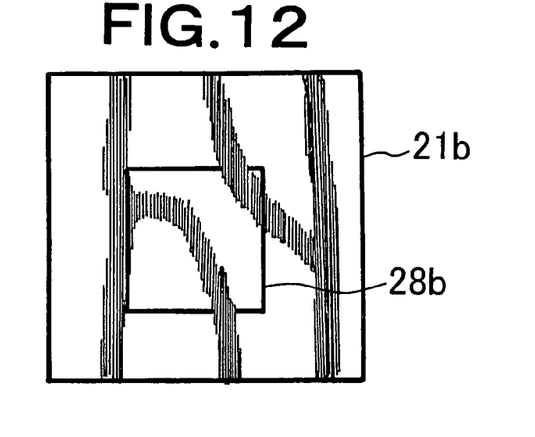
FIG. 12 shows an example of a finger/palm print image in a small region.
Figure 13:
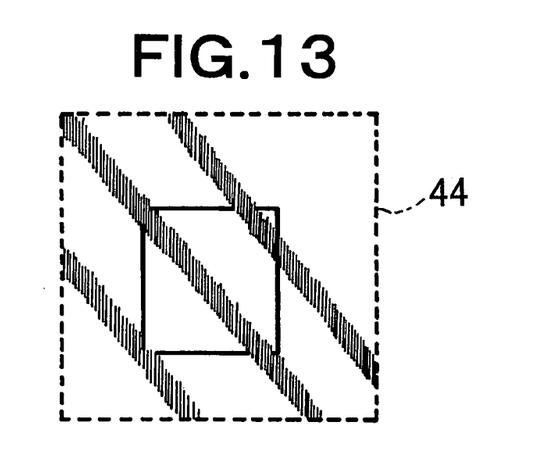
FIG. 13 shows an example of a finger/palm print image in a small region.
Figure 14:
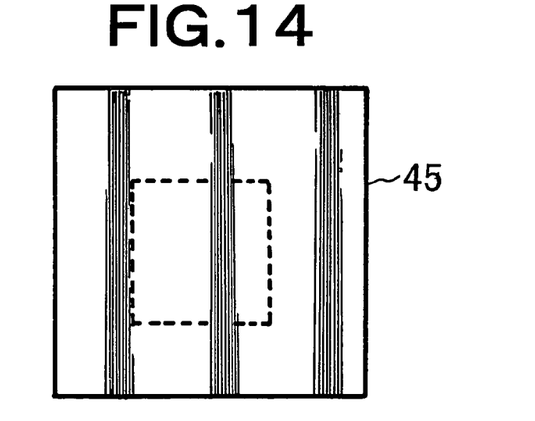
FIG. 14 shows an example of a finger/palm print image in a small region.

FIGS. 9 to 14 show examples of images of finger/palm prints in small regions. With respect to a small region 21a as shown in FIG. 9 in which ridgelines form a monotonous flow, ridgelines at a center portion 28a are approximated to periodical lines as shown in a small region 41 in FIG. 10. Ridgelines of the entire small region 21a are approximated to periodical lines as shown in a small region 42 in FIG. 11. Therefore, the approximation (41) based on the center portion 28a and the approximation (42) based on the entire small region 21a have the same pattern. On the other side, with respect to a small region 21b having a fine structure such as characterizing points as shown in FIG. 12, ridgelines at a center portion 28b are approximated to periodical lines as shown in a small region 44 in FIG. 13. Ridgelines of the entire small region 21b are approximated to periodical lines as shown in a small region 45 in FIG. 14. Therefore, the approximation (44) based on the center portion 28b and the approximation (45) based on the entire small region 21b respectively have different patterns. Hence, whether a small region is a monotonous region or a region having a fine structure can be judged by comparing frequency components of the center portion and frequency components of the entire and by judging whether or not both frequency components to coincide with one another or fall within a predetermined range.

(5) Step S25

Referring to FIG. 8, based on the judgment result obtained for each small region by the frequency component judgment unit 12a, the ridgeline image extraction unit 15 selects a proper ridgeline extraction/restoration method for each small region, and extracts/restores an image of ridgelines. Extraction/restoration results are outputted to the output device 5.

With respect to a clear small region, a threshold value which divides a finger/palm print image properly into ridgelines and valley lines is obtained based on a histogram of pixel values of each small region, to perform binarization, like in JP-A-8-110945. Thus, ridgelines can be restored with fidelity to an original image. With respect to an unclear small region which includes a wrinkle or scratch, one small region is restored as a monotonous pattern such as a two-dimensional sinusoidal wave, like in JP-A-9-167230. Thus, ridgelines can be restored without influences from a scratch or wrinkle.

With respect to small regions each judged to have a fine structure, binarization is carried out by obtaining a threshold value which properly divides a finger/palm print image into ridgelines and valley lines, based on a histogram of pixel values of each small region like in JP-A-8-110945. Thus, ridgelines can be restored with fidelity to an original image. With respect to small regions each judged to have a monotonous flow, one small region can be restored as a monotonous pattern of a two-dimensional sinusoidal wave or the like, like in JP-A-9-167230.

Characterizing amounts at the time when the frequency component judgment unit 12a judges a small region to be clear or not and to have a fine structure or to be a monotonous region are used as scales indicating clarity and monotony. Parameters of a directivity filter are changed in correspondence with the scales. A strong directivity filter is used corresponding to monotony, and a weak directivity filter is used corresponding to complexity and clarity, thereby to emphasize an inputted image. In this manner, a proper ridgeline image can be extracted/restored for each small region.

(6) Step S26

Referring to FIG. 8, the ridgeline image extraction unit 15 checks whether or not ridgelines of all the small regions have been extracted/restored. If there still is a small region which has not yet been extracted/restored, the unit 15 returns to the step S23 and checks a next region.

(7) Step S27

The ridgeline image restoration unit 15 restores the entire finger/palm print image, based on restored ridgelines of each small region, and outputs the restored image to the output device 5. The output device 5 outputs the finger/palm print image.

In the present invention, the method for extracting ridgelines is decided by use of a judgment result for each small region, and the ridgelines are then restored. Therefore, ridgelines of a finger/palm print can be restored more accurately.

In the present invention, the finger/palm print image input device 3 does not input a finger/palm print image at once but may input sequentially partial images used for analyzing small regions by the finger/palm print image processing device 4(a). If the entire of a finger/palm print image is inputted and if storage capacity of the finger/palm print image processing device 4(a) is too small to store the entire finger/palm print image at once, image processing can then be impossible. However, if partial images region sequentially inputted, image processing can be executed with only necessary storage capacity for processing a small region.

If the finger/palm print image input device 3 accepts an input from a finger/palm print sensor through a network having a low communication speed or if a communication speed is low between the finger/palm print image input device 3 and the finger/palm print image processing device 4(a), image processing cannot be started before communication of the entire finger/palm print image is finished even when inputting of the entire is attempted. However, by inputting sequentially partial images, image processing can be started from a stage on which only an image of a small region required by the frequency component analysis unit 11(a). In this manner, communication and frequency component analysis can be carried out in parallel so that a processing time can be shortened. As the input method, there can be a method in which every time when an image of a small region is obtained by the finger/palm print image input device 3, the image is sent to a computer. There can be another method in which, in a stage after image processing of one small region is finished by the frequency component analysis unit 11(a), the finger/palm print image processing device 4(a) requests an image of a next small region from the finger/palm print image input device 3. In response to the request, the finger/palm print image input device 3 sends the image. However, the input method is not limited to these examples.

In the present invention, with respect to a judgment of image quality of a finger/palm print image, not only contrasting density of pixels is judged but also whether frequency components are those observed in ridgelines of a finger/palm print or not is judged. Therefore, a background having pixel values at a level substantially equal to that of a finger/palm print can be distinguished from ridgeline regions of the finger/palm print. As a result of this, even if any other contrasting density such as dirt than a finger/palm print exists in the background, finger/palm print regions can be judged correctly.

In the present invention, a judgment of image quality of a finger/palm print image is made not by use of contrasting density of pixels or concentration of end points and branch points but by use of whether frequency components are those observed in clear ridgelines of a finger/palm print or not. Unclear regions caused by a scratch, blurring, or the like, and regions where clear ridgelines exist can be distinguished. As a result of this, a finger/palm print region can be judged correctly even if an unclear part exists in a finger/palm print region due to influences from noise.

In the present invention, whether a region can be expressed as a monotonous flow or needs fine restoration is judged. In accordance with a judgment result, an appropriate restoration method can be used. As a result of this, ridgelines can be extracted accurately even from a part including a wrinkle or scratch or even when ridgelines have a fine structure.

INDUSTRIAL APPLICABILITY

As described above, the present invention is suitable for use in a finger/palm print image processing system and a finger/palm print image processing method which have improved functions of image processing of a finger/palm print.

The invention claimed is:

1. A finger/palm print image processing system comprising:
   a frequency component analysis unit configured to perform a frequency analysis on each of plural small regions into which a finger/palm print image is divided, to obtain plural frequency components representing each of the plural small regions; and
   a frequency component judgment unit configured to judge clarity of the small regions corresponding to the frequency components, based on the frequency components, wherein:
   said finger/palm print image indicates at least one of a finger print and a palm print;
   said frequency component analysis unit obtains a first analysis result of performing a frequency analysis on a center portion of the small region, and a second analysis result of performing a frequency analysis on the small region including peripheral portions; and
   said frequency component judgment unit judges the small region to be a region having a fine structure if a difference exists between the first and second analysis results, or judges the small region to be a region having a monotonous flow if no difference exists between the first and second analysis results.

2. The finger/palm print image processing system according to claim 1, wherein:
   said frequency component analysis unit uses a Fourier transform as the frequency analysis; and
   said frequency component judgment unit judges clarity of the small region corresponding to the frequency components, based on the frequency components and a result of subjecting a clear two-dimensional sinusoidal wave to a Fourier transform.

3. The finger/palm print image processing system according to claim 1, wherein
   said frequency component analysis unit decides one point in a frequency space as the frequency components based on a result of the frequency analysis, and approximates the small region corresponding to the frequency components, to a representative point two-dimensional sinusoidal wave as a two-dimensional sinusoidal wave corresponding to the one point in the frequency space.

4. The finger/palm print image processing system according to claim 1, further comprising
   a ridgeline image extraction unit configured to change a method of extracting ridgelines from the finger/palm print image in the small region, based on the judgment result of clarity of the small region for each of the plural small regions, and to extract the ridgelines.

5. A finger/palm print image processing method comprising:
   a step (a) of performing a frequency analysis on each of plural small regions into which a finger/palm print image is divided, to obtain plural frequency components representing each of the plural small regions, the finger/palm print image indicating at least one of a finger print and a palm print; and
   a step (b) of judging clarity of the small regions corresponding to the frequency components, based on the frequency components, wherein:
   said step (a) includes a step (a4) of obtaining a first analysis result performing a frequency analysis on a center portion of the small region, and a second analysis result performing a frequency analysis on the small region including peripheral portions; and
   said step (b) includes a step (b3) of judging the small region to be a region having a fine structure if a difference exists between the first and second analysis results, or judging the small region to be a region having a monotonous flow if no difference exists between the first and second analysis results.

6. The finger/palm print image processing method according to claim 5, wherein:
   said step (a) includes a step (a1) of using a Fourier transform as the frequency analysis; and
   said step (b) includes a step (b1) of judging clarity of the small region corresponding to the frequency components, based on the frequency components and a result of subjecting a clear two-dimensional sinusoidal wave to a Fourier transform.

7. The finger/palm print image processing method according to claim 5, wherein said step (a) includes:

a step (a2) of deciding one point in a frequency space as the frequency components, based on a result of the frequency analysis; and a step (a3) of approximating the small region corresponding to the frequency components, to a representative point two-dimensional sinusoidal wave as a two-dimensional sinusoidal wave corresponding to the one point in the frequency space.

8. The finger/palm print image processing method according to claim 5, further comprising a step (d) of changing, for each of the plural small regions, a method of extracting ridgelines from the finger/palm print image in the small region, based on the judgment result of clarity of the small region, and extracting the ridgelines.

9. A computer readable program embodied on a computer readable storage unit for making a computer execute a method, the method comprising:

a step (a) of performing a frequency analysis on each of plural small regions into which a finger/palm print image is divided, to obtain plural frequency components representing each of the plural small regions, said finger/palm print image indicating at least one of a finger print and a palm print; and a step (b) of judging clarity of the small regions corresponding to the frequency components, based on the frequency components, wherein:

said step (a) includes a step (a4) of obtaining a first analysis result performing a frequency analysis on a center portion of the small region, and a second analysis result performing a frequency analysis on the small region including peripheral portions; and said step (b) includes a step (b3) of judging the small region to be a region having a fine structure if a difference exists between the first and second analysis results, or judging the small region to be a region having a monotonous flow if no difference exists between the first and second analysis results.

10. The program according to claim 9, wherein:

said step (a) includes a step (a1) of using a Fourier transform as the frequency analysis; and said step (b) includes a step (b1) of judging clarity of the small region corresponding to the frequency components, based on the frequency components and a result of subjecting a clear two-dimensional sinusoidal wave to a Fourier transform.

11. The program according to claim 9, wherein said step (a) includes:

a step (a2) of deciding one point in a frequency space as the frequency components, based on a result of the frequency analysis; and a step (a3) of approximating the small region corresponding to the frequency components, to a representative point two-dimensional sinusoidal wave as a two-dimensional sinusoidal wave corresponding to the one point in the frequency space.

12. The program according to claim 9, further comprising a step (d) of changing, for each of the plural small regions, a method of extracting ridgelines from the finger/palm print image in the small region, based on the judgment result of clarity of the small region, and extracting the ridgelines.

* * * * *